US011333194B2

(12) United States Patent
Radcliffe

(10) Patent No.: US 11,333,194 B2
(45) Date of Patent: May 17, 2022

(54) PAD FOR A TILTING PAD THRUST BEARING ASSEMBLY AND THRUST BEARING ASSEMBLY

(71) Applicant: SULZER MANAGEMENT AG, Winterthur (CH)

(72) Inventor: Christopher David Radcliffe, West Yorkshire (GB)

(73) Assignee: SULZER MANAGEMENT AG, Winterthur (CH)

( * ) Notice: Subject to any disclaimer, the term of this patent is extended or adjusted under 35 U.S.C. 154(b) by 11 days.

(21) Appl. No.: 16/768,148

(22) PCT Filed: Mar. 13, 2019

(86) PCT No.: PCT/EP2019/056357
§ 371 (c)(1),
(2) Date: May 29, 2020

(87) PCT Pub. No.: WO2019/175287
PCT Pub. Date: Sep. 19, 2019

(65) Prior Publication Data
US 2020/0318680 A1 Oct. 8, 2020

Related U.S. Application Data

(60) Provisional application No. 62/643,308, filed on Mar. 15, 2018.

(51) Int. Cl.
*F16C 17/06* (2006.01)
*F16C 33/10* (2006.01)
(52) U.S. Cl.
CPC ............ *F16C 17/06* (2013.01); *F16C 33/108* (2013.01)

(58) Field of Classification Search
CPC ........ F16C 17/03; F16C 17/035; F16C 17/06; F16C 17/065; F16C 33/1065; F16C 33/1075; F16C 33/108
See application file for complete search history.

(56) References Cited

U.S. PATENT DOCUMENTS

| 2,871,070 | A | 1/1959 | Dunn |
| 6,739,756 | B2 | 5/2004 | Miller |
| 9,670,957 | B2 * | 6/2017 | Hemmi ............... F16C 33/1065 |
| 9,874,216 | B2 * | 1/2018 | Gulati ....................... F04D 1/06 |
| 2015/0132105 | A1 | 5/2015 | Hemmi et al. |

FOREIGN PATENT DOCUMENTS

| CH | 345205 A | 3/1960 |
| DE | 420847 C | 11/1925 |

OTHER PUBLICATIONS

International Search Report dated May 28, 2019 in corresponding International Patent Application No. PCT/EP2019/056357, filed Mar. 3, 2019.

* cited by examiner

*Primary Examiner* — James Pilkington
(74) *Attorney, Agent, or Firm* — Global IP Counselors, LLP

(57) ABSTRACT

A pad for a tilting pad thrust bearing for supporting the shaft of a rotary machine includes a top surface, a leading edge extending in a radial direction and a trailing edge. The pad further includes a fluid channel arranged at the top surface, the fluid channel ending in the top surface, and the fluid channel forming a fluid communication between the leading edge of the pad and the top surface of the pad.

12 Claims, 9 Drawing Sheets

PAD FOR A TILTING PAD THRUST BEARING ASSEMBLY AND THRUST BEARING ASSEMBLY

CROSS-REFERENCE TO RELATED APPLICATION

This application is a U.S. National Stage application of International Application No. PCT/EP2019/056357, filed Mar. 13, 2019, which claims the benefit of U.S. Provisional Patent Application No. 62/643,308, filed Mar. 15, 2018, the contents of each of which are hereby incorporated herein by reference.

BACKGROUND

Field of the Invention

The invention relates to a pad for a tilting pad thrust bearing for supporting the shaft of a rotary machine. The invention further relates to a tilting pad thrust bearing arrangement comprising such a pad and to a centrifugal pump comprising such a thrust bearing. The centrifugal pump can be configured e.g. as a radial pump or as an axial pump or as a helico-axial pump.

Background Information

Tilting pad thrust bearing arrangements are commonly used in rotating machinery such as motors, pumps, compressors, turbines, engines, gearboxes, drive shafts, propeller shafts etc., having shafts orientated in a vertical, horizontal or other direction. A thrust bearing is designed to support the axial forces acting on a rotating shaft and to maintain the rotating components in the correct axial location with respect to the fixed parts of the machine. The axial direction is defined by the axis of the shaft.

SUMMARY

In particular, embodiments of the invention relate to a pad and a tilting pad thrust bearing for subsea applications, e.g. a thrust bearing of a subsea pump, in particular a helico-axial pump. In view of an efficient exploitation of oil and gas fields there is nowadays an increasing demand for pumps that can be installed directly on the sea ground in particular down to a depth of 100 m, down to 500 m or even down to more than 1,000 m beneath the water surface. Needless to say that the design of such pumps and its components is challenging, in particular because these pumps shall operate in a difficult subsea environment for a long time period with as little as possible maintenance and service work. This requires specific measurements to minimize the amount of equipment involved and to optimize the reliability of the pump and its components. In particular, a subsea pump has to be configured to withstand the ambient hydrostatic pressure of the seawater. For example in 500 m below the water surface the hydrostatic pressure of the seawater is already about 50 bar, meaning that the minimum pressure inside the pump housing has to be at least somewhat greater than 50 bar. Therefore, also the bearings and other components of the pump have to be configured for operation at such pressures.

A typical tilting pad thrust bearing (TPTB) arrangement normally comprises a collar or a runner which is a usually flat, circular or annular face, extending perpendicular to the shaft axis and fixed to the shaft axis in a torque proof manner for rotating with the shaft. There are normally two sides of the thrust bearing which handle the load and movement in either direction.

The tilting pad thrust bearing assembly comprises a number of individual pads which are arranged around the collar so that each pad can carry part (or all) of the total thrust load. Sets of pads are normally provided for both axial directions. The general design principle provides that a plurality of bearing pads in the form of a ring-shaped grouping are arranged on a usually metallic support body about the shaft for cooperating with the collar. The thrust bearing assembly or the bearing housing thereof is usually flooded with a circulating fluid as a lubricant. The pads per se are composed of a metal, plastic, etc. in dependence on the use and have the general shape of a trapezoidal parallelepiped on whose side facing the support body a tilting or pivot element is located on which the bearing pad is supported.

When the collar starts to rotate, a shearing of the fluid takes place between the collar and the pads and the collar slides over the pads. The forming of a wedge-shaped or stepped hydrodynamic lubricant film, which is an essential component in the operation of the thrust bearing arrangement, results in a tilting of each pad since they are supported on a tilting element. The start phase and the stop phase are particularly critical operating ranges for the tilting pad thrust bearings, for example in pumps, since very high axial forces act in part in this respect. In these phases, the hydrodynamic lubricant film has not yet fully formed so that the collar and the bearing pad can contact one another directly without substantial hydrodynamic lubrication and wear occurs.

The pads are generally mounted loosely and discretely with respect to the support body to avoid misalignments and to match the tilting of the bearing pads, which is effected by the formation of the hydrodynamic lubricant film, to the rotating shaft. The loose mounting is in this respect restricted in principle in that the pads have to be held within the arrangement when the shaft does not rotate, that is for example in that the bearing pads are connected to one another by a flexible net or are fastened in a groove at the support body by a fastening means or device (fastener).

As already said, the thrust bearing normally includes a number of pads which are arranged in a circular fashion around the shaft. The operation of all the pads is similar so only one pad is considered in detail.

FIGS. 1A and 1B show a plan view of a pad 1' (upper part) as well as a cross-sectional view (lower part) of the pad 1'. FIGS. 1A and 1B show a pad 1' as it is known in the art. The pad 1' comprises a top surface 2' which faces the collar 9' (FIG. 2) and is separated from the collar 9' by a fluid film during operation. FIG. 1 shows a plan view on the top surface 2'. The top surface 2' is also referred to as active surface. In FIG. 1A the center line C' denotes the middle line of the top surface 2' extending in radial direction. The "back" of the pad 1', also referred to as bottom face 3', has a pivot element 4', e.g. a pivot bar or a pivot point or other arrangement so that it freely tilts around a line or a point and transfers load into the supporting housing. The pad 1' is arranged on a stationary support body 10' such that the pivot element 4' is supported by the support body 10'. The location of the pivot element 4' is indicated by the support line S' in FIG. 1A. The top surface 2' of the pad 1' is nominally flat, or has a slight convex curvature (crowning) which is designed to suit the operating parameters of the bearing, which includes speed, load, lubricant viscosity, temperature etc.

The pad 1' comprises a leading edge 5', a trailing edge 6', an outer edge 7' and an inner edge 8'. The leading edge 5' and the trailing edge 6' are defined by the rotation of the collar indicated by the arrow R' in FIG. 1A. The collar rotates from the leading edge 5' to the trailing edge 6' of the pad. The outer edge 7' is the radially outer edge and the inner edge 8' is the radially inner edge of the pad 1'. FIG. 1A refers to a counterclockwise rotation R'. Of course, the rotation R' could also be in the opposite direction, i.e. clockwise. In this case the pad geometry would be a mirror image of FIG. 1A around the center line C'.

The mechanism of operation of a TPTB is well established and was originally proposed by A. G. M. Michell in 1905, based on the hydrodynamic lubrication theory from Osbourne Reynolds (1886). The principle has been applied to countless thousands of machine bearings since that time.

The fluid film between the pad 1' and the collar is extremely thin, in the order of only 10's to 100's of micrometers, depending on the exact operating conditions. Almost flat surfaces are required in order to generate the highest bearing pressures without risking breaking through the very thin fluid films.

The tilting pad thrust bearing operates under load and is self-activated to tilt the pads forward into a convergent film profile which generates hydrodynamic pressure thus creating a force to separate the moving surfaces, i.e. the top surface 2' and the surface of the collar. "To tilt forward" means (FIG. 2) a tilting that brings the trailing edge 6' closer to the surface of the collar 9' and moves the leading edge 5' away from the surface of the collar 9'. This is schematically shown in FIG. 2. FIG. 2 shows the pad 1' in a forward tilt position during operation. The fluid, e.g. the lubricant is entrained into the convergent gap between the leading edge 5' and the collar 9' as indicated by the arrow F' in FIG. 2.

Thrust bearings are normally operating in pairs, handling the loads in each direction on a shaft. The whole bearing assembly is setup with an axial clearance space between the collar 9' and the pad 1' to allow expansion while ensuring that only one half of the bearing is loaded at any one time. Therefore there will often be one set of bearings whose pads operates with little or no externally applied load; individual pads could also be unloaded if they have a shorter pad height H' (FIG. 1B) than the others even if they are in the "loaded" side of a bearing assembly.

Although tilting pad thrust bearing assemblies have been used for more than hundred years, there are still problems which have not been solved until today. In particular, when a tilting pad thrust bearing is used under high pressure, e.g. with a pressure of the lubricant in the bearing housing of 50 bar or even more, excessive wear, in particular at the leading edge of the pad, has been observed. The reason for this has not yet been fully understood. In particular, in view of subsea applications requiring as little as possible maintenance and service work, such excessive wear is detrimental.

Starting from this prior art it is an object of the invention to propose a pad for a tilting pad thrust bearing and a tilting pad thrust bearing assembly which avoid such excessive wear. The pad and the bearing assembly should in particular be suited for subsea applications. Furthermore, it is an objective of the invention to propose a centrifugal pump comprising such a tilting pad thrust bearing assembly.

The subject matter of the invention satisfying this object is characterized by the features of the embodiments discussed herein.

Thus, according to embodiments of the invention, a pad for a tilting pad thrust bearing for supporting the shaft of a rotary machine is proposed, the pad comprising a top surface, a leading edge extending in a radial direction and a trailing edge, wherein the pad comprises a fluid channel arranged at the top surface, the fluid channel ending in the top surface, the fluid channel forming a fluid communication between the leading edge of the pad and the top surface of the pad.

The "radial direction" refers to the operational state, when the pad is arranged in a tilting pad thrust bearing assembly for supporting a shaft of a rotary machine. The longitudinal axis of the shaft, about which the shaft rotates during operation, defines the axial direction. A direction perpendicular to the axial direction is referred to as a radial direction. Thus, during operation the leading edge of the pad extends in a radial direction.

It is an important finding on which the invention is based, that the excessive wear at the leading edge is caused by a reverse tilting of the pads in tilting pad thrust bearings according to the prior art. "Reverse tilting" means that the unloaded or only weakly loaded pad tilts just in the opposite direction as compared to the forward tilting, i.e. reverse tilting means a tilting that brings the leading edge 5' closer to the surface of the collar 9' and moves the trailing edge 6' away from the surface of the collar 9'. This is schematically shown in FIG. 3 in an analogous manner as in FIG. 2 for the forward tilting. FIG. 3 shows the pad 1' in a reverse tilt position during operation. The leading edge 5' of the pad 1' is in physical contact with the collar 9' and seals the inlet for the fluid into the space between the pad 1' and the collar 9'. The fluid, e.g. the lubricant is drawn out of the gap between the pad 1' and the collar 9' as indicated by the arrow D' in FIG. 3.

Thus, reverse tilting is a tilting in a direction which is opposite to the direction the pad should tilt during correct operation. By this reverse tilting the leading edge is forced into contact with the collar, thus providing a fluid seal which avoids the generation of a complete fluid film between the pad and the collar.

According to embodiments of the invention the fluid channel forms a fluid communication between the leading edge of the pad and the top surface of the pad. Thus, even if parts of the leading edge are in physical contact with the collar the fluid, e.g. a lubricant, can flow through the fluid channel to the top surface of the pad.

The balance of forces acting on an unloaded pad decides in which direction the pad will tilt. Depending on the direction of the thrust force on the shaft, and the orientation of the machine axis (vertical/horizontal), there can be unloaded pads at either side of the collar. Whatever the situation, any unloaded pads will tend to "reverse tilt" opposite to the normal tilt direction, therefore bringing the pad leading edge into close sliding contact with the rotating collar. This frictional drag force which this creates is normally low and insignificant compared to the friction forces on an loaded bearing pad.

The situation of an unloaded bearing pad which has taken a reverse pivoted attitude means that the pad tilts in the reverse direction to the normal active operation, and so all of the normal functioning is reversed too. The previously mentioned hydrodynamic lubrication theory which describes the normal positive pressure film generation, also theoretically predicts that a negative pressure will be generated when there is reverse pad tilt because the fluid is expanded in the diverging contacting. In practice, however, a fluid cannot sustain a negative pressure, or support significant tensile stresses in a fluid film. If the fluid, e.g. the lubricant, surrounding the pad is nominally at atmospheric pressure, then a negative pressure differential of only about 1 bar maximum can be created across the pad and so the unloaded pad will always be able to slide easily against the collar and operate with a normal degree of lubrication.

Considering instead now the situation of an unloaded bearing pad operating in a thrust bearing surrounded by pressurized fluid inside the bearing housing, e.g. at 70 bar, it can be noticed that the negative differential pressure which is generated by a reverse tilted pad is increased, and so the load tending to "suck" the pad into contact with the collar will increase in proportion to the bearing housing absolute pressure. In practice it has been observed that this mechanism can cause the unloaded pads to suffer severe premature wear leading to bearing failures in machines with highly pressurized bearing housings. Just as an example: In subsea applications the bearing housing can be pressurized up to pressures of 200 bar or even more.

Embodiments of the invention provide a solution for a pad for a tilting pad thrust bearing and a tilting pad thrust bearing which avoid the adverse effects, in particular the excessive wear, caused by a reverse tilt of the pad.

It is proposed to provide a fluid entry to the top surface (active surface) of the pad. According to a preferred embodiment an inlet pocket is disposed at the leading edge of the pad, the inlet pocket forming a flow channel extending from the leading edge to the top surface of the pad.

Preferably, the fluid entry is designed as a face slot located at the leading edge of the pad. The depth of the face slot—as measured in the axial direction (direction of the rotation axis of the shaft) is largest at the leading edge and decreases towards the center line of the top surface of the pad, so that the slot is designed as a tapered slot. With respect to the radial direction it is preferred that the slot does not extend over the entire length of the leading edge, but at each side (with respect to the radial direction) of the slot includes a "horn" or a land, each horn or land being flush with the top surface of the pad. Thus, the leading edge the fluid channel constitutes a cut-out in the top surface with the cut-out being arranged between the two lands. Therefore, even if a reverse tilting of the pad occurs, one of the horns can contact the collar, but the slot remains open, so that the fluid can enter between the top surface of the pad and the collar. Preferably the slot extends over 80% of the leading edge and each horn or land extends over approximately 10% of the leading edge. Preferably the two lands are arranged symmetrically with respect to the slot. The bottom of the slot can be flat or can be curved.

Some kind of fluid entry "step" or taper at the leading edge of the pad will help fluid to enter, but a feature which exists right across the entire leading edge, like a full taper, could still block if the pad tilts through a large angle. Note that the degree by which an unloaded pad can reverse tilt depends on the amount of axial clearance which it has. This could be up to 0.5 mm or more, so an inlet feature would need to be very deep. Therefore it is proposed that a preferred better solution is to create an inlet pocket (slot) which does not cover the full width of the pad. In this way, if the pad reverse tilts, the front leading edge of the pad will contact the rotating collar and will leave an entry slot for fluid to flow into.

According to different designs it is possible that
the fluid channel forms a fluid communication between the exterior of the pad and the top surface of the pad,
the fluid channel is designed to taper towards a central line of the top surface,
the fluid channel extends from the bottom face to the top surface of the pad,
the fluid channel is disposed in the top surface of the pad, and the fluid channel extends from the inner edge to the outer edge of the pad.
the pad comprises a plurality of fluid channels.

The invention comprises a geometric feature on the face of the bearing pad which prevents the high wear mechanism which is caused by reverse tilting in particular in a pressurized bearing housing.

According to an aspect of the invention, the invention works by preventing the formation of a fluid seal at the pad's leading edge.

Embodiments of the invention can comprise one or several alternative geometric forms which allow fluid to easily enter the pad contact even when the pad is in an adverse, reverse tilted situation and so preventing a negative pressure gradient from forming and thus minimizing the load and wear on the pad.

In the embodiments having a large axial clearance space, and/or flatter pads (low convexity) the contact point between the reverse tilted pad and the collar will move towards the very apex of the leading edge and will form a strong line seal. Even in this embodiment, the relief slot mechanism according to the invention still functions to allow fluid to leak onto the pad top surface and so prevents a strong negative pressure gradient being formed.

The invention can be implemented by a number of alternative geometric features.

Embodiments of the invention will act to stabilize and reduce "pad flutter" which is a dynamically unstable condition which can arise on unloaded tilting thrust pads.

Of course, the invention can also be applied to the more common ambient pressure thrust bearings where it will reduce frictional drag on the unloaded bearing pads and will also reduce the tendency for unloaded pads to flutter.

According to a preferred embodiment, the fluid channel is designed as a face slot in the top surface of the pad, wherein a depth of the face slot is largest at the leading edge and decreases towards a centerline of the top surface.

Preferably the width of the fluid channel measured in the radial direction at the leading edge of the pad is smaller than the length of the leading edge in the radial direction, i.e. the fluid channel does not extend along the entire leading edge.

According to preferred embodiments the width of the fluid channel measured in the radial direction at the leading edge is at least 50% and at most 90%, preferably about 80% of the length of the leading edge in the radial direction.

It is a preferred measure that the leading edge comprises at least one land delimiting the fluid channel at the leading edge with respect to the radial direction, wherein the land is flush with the top surface.

According to a particularly preferred embodiment the leading edge comprises a radially inner land and a radially outer land, wherein the fluid channel is arranged between and delimited by the radially inner land and the radially outer land, and wherein each land is flush with the top surface.

In addition, it is preferred that the radially inner land is arranged at a radially inner end of the leading edge and the radially outer land is arranged at a radially outer end of the leading edge.

According to a further embodiment the pad comprises a plurality of fluid channels, wherein each fluid channel forms a fluid communication between the leading edge of the pad and the top surface of the pad, wherein each fluid channel is designed as a face slot in the top surface of the pad, and wherein adjacent fluid channels are separated by a land at the leading edge.

It is a preferred measure that each fluid channel has a maximum depth at the leading edge. Each channel can be configured with a curved bottom side in the top surface or with a planar, i.e. not curved, bottom side.

Regarding the extension of the fluid channel(s) it is an advantageous design when each fluid channel has a length measured in the top surface and perpendicular to the leading edge which is at most 50%, preferably at most 25%, and even more preferred about 10% of a circumferential length of the pad. The circumferential length is the extension of the pad in circumferential direction measured as the chord length at the middle radial position, i.e. in the middle between the radially outer edge of the pad and the radially inner edge of the pad.

In addition, according to embodiments of the invention, a tilting pad thrust bearing assembly for supporting a shaft of a rotary machine is proposed comprising a bearing housing for receiving a lubricant, a support body and a plurality of pads arranged at the support body, wherein each pad is configured in accordance with the invention.

Preferably the tilting pad thrust bearing assembly is configured for an internal pressure in the bearing housing of at least 50 bar.

Furthermore, according to the invention a centrifugal pump is proposed, having a pump housing, at least one impeller for acting on a process fluid, a shaft fixedly connected with the impeller for rotating the impeller and an axial bearing for supporting the shaft with respect to an axial direction, wherein the axial bearing comprises a tilting pad thrust bearing assembly in accordance with the invention.

According to a preferred embodiment the centrifugal pump is configured as a multistage pump with a plurality of impellers. In particular, the centrifugal pump can be designed as a helico-axial pump.

According to a preferred embodiment the centrifugal pump is configured for installation on a sea ground.

Further advantageous measures and embodiments of the invention will become apparent from the description herein.

BRIEF DESCRIPTION OF THE DRAWINGS

The invention will be explained in more detail hereinafter with reference to the drawings.

DETAILED DESCRIPTION OF THE EMBODIMENTS

Figure 1A:
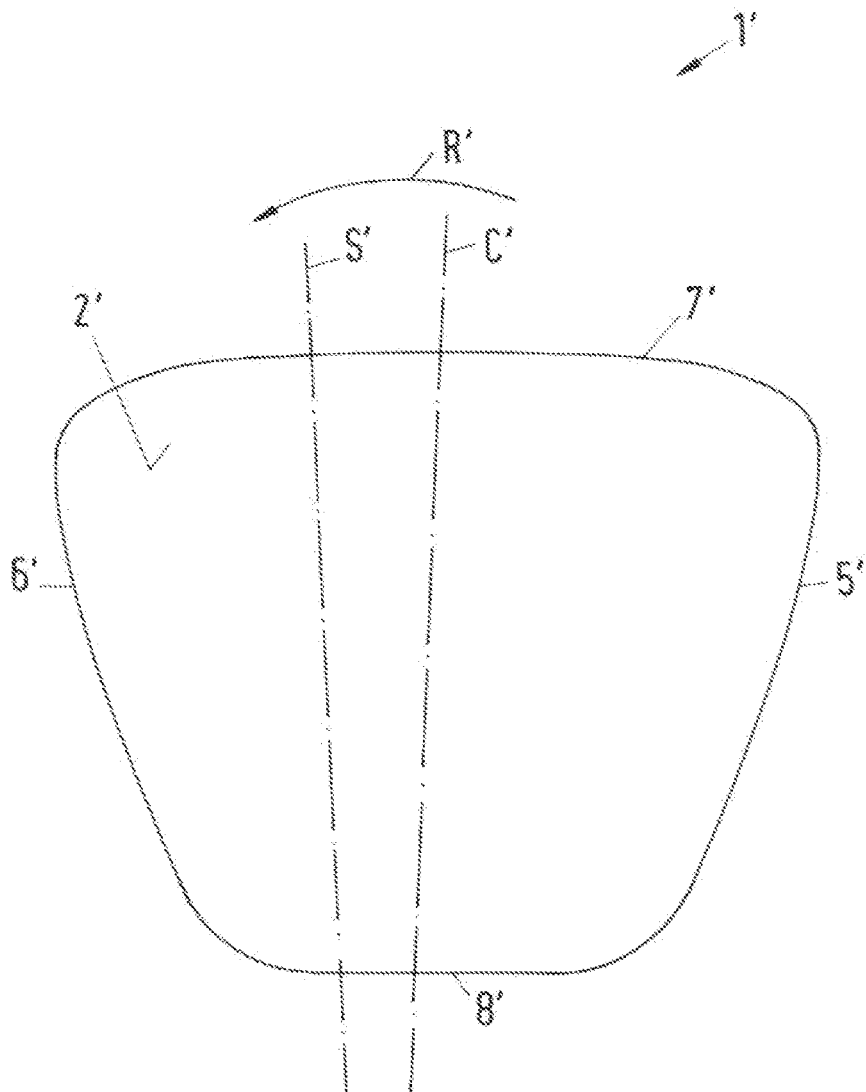
FIG. 1A is a plan view and FIG. 1B is a cross-sectional view of a pad for a tilting pad thrust bearing according to the prior art.
Figure 1B:
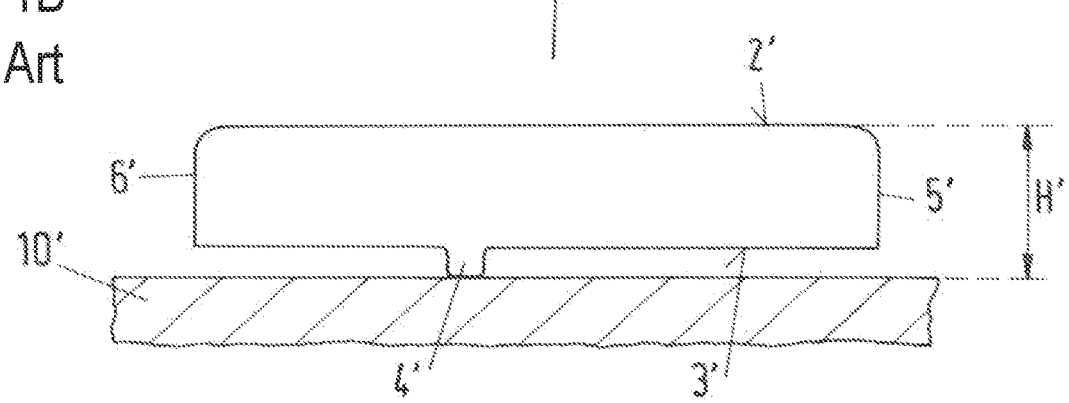
Figure 2:
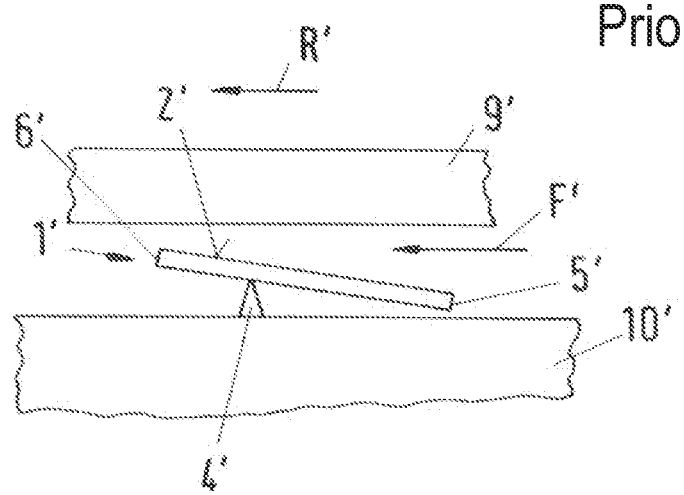
FIG. 2 is a schematic representation of the forward tilting.
Figure 3:
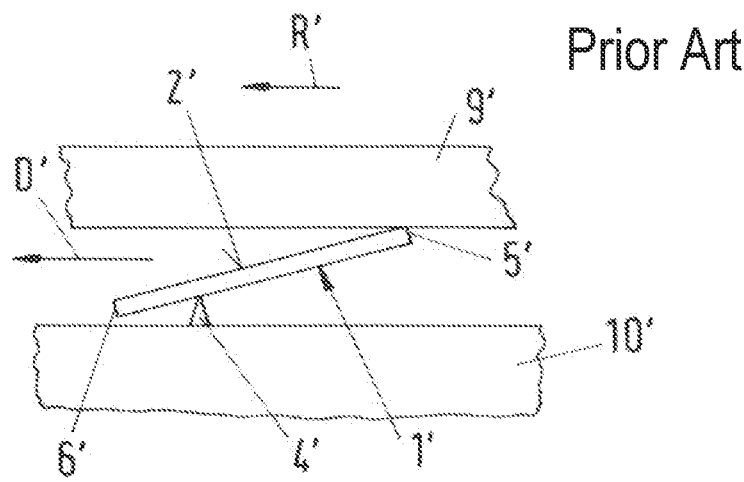
FIG. 3 is a schematic representation of the reverse tilting.

FIG. 1A shows a plan view (upper part) and FIG. 1B shows a cross-sectional view (lower part) of a pad 1' for a tilting pad thrust bearing according to the prior art. FIG. 2 and FIG. 3 show schematic illustrations of the forward tilting and the reverse tilting of a pad 1' in a tilting pad thrust bearing. Since FIG. 1A-FIG. 3 have already been explained hereinbefore in the description of the prior art no further explanations are necessary. In order to differentiate the prior art arrangement over the embodiments according to the invention, the components of the pad 1' representing prior art are designated in FIG. 1A-FIG. 3 with reference numerals having a prime (inverted comma) behind the respective reference numeral.

Figure 4:
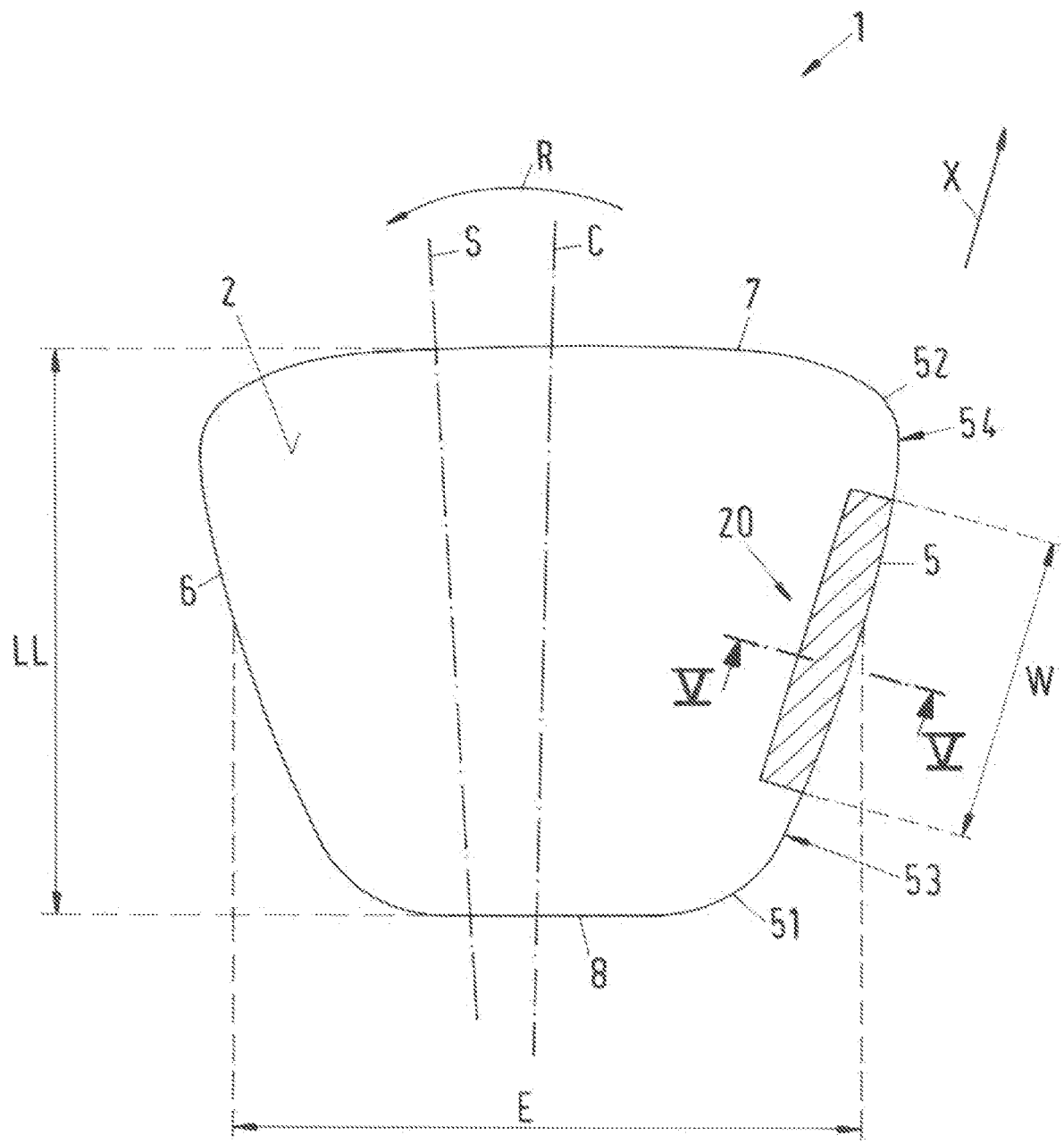
FIG. 4 is a plan view of a first embodiment of a pad for a tilting pad thrust bearing according to the invention.
Figure 5:
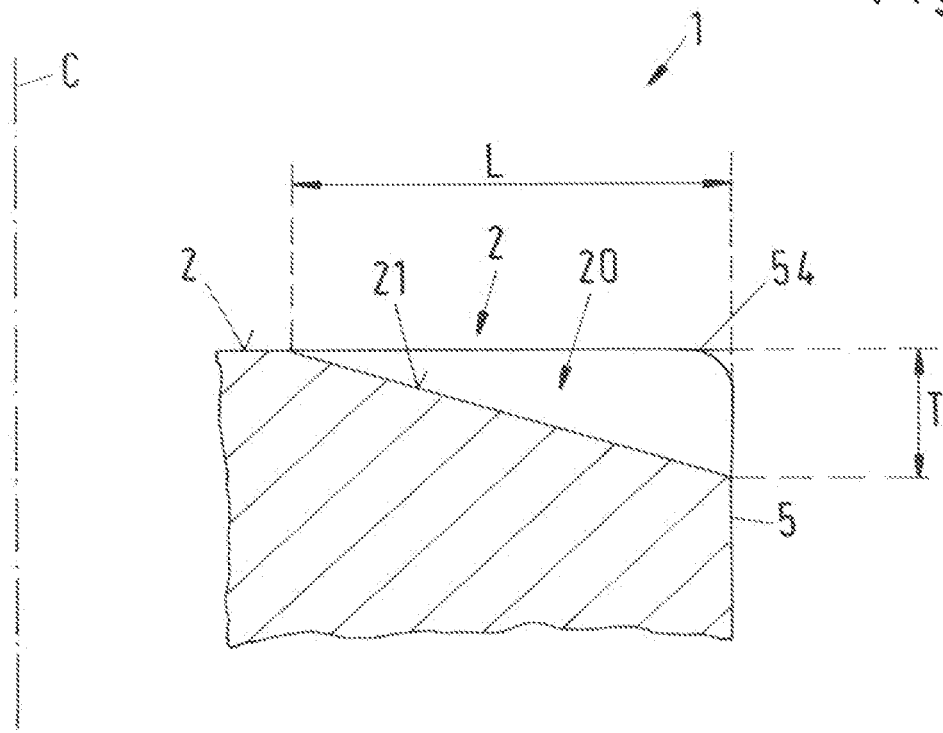
FIG. 5 is an enlarged cross-sectional view along cutting line V-V in FIG. 4.
Figure 6:
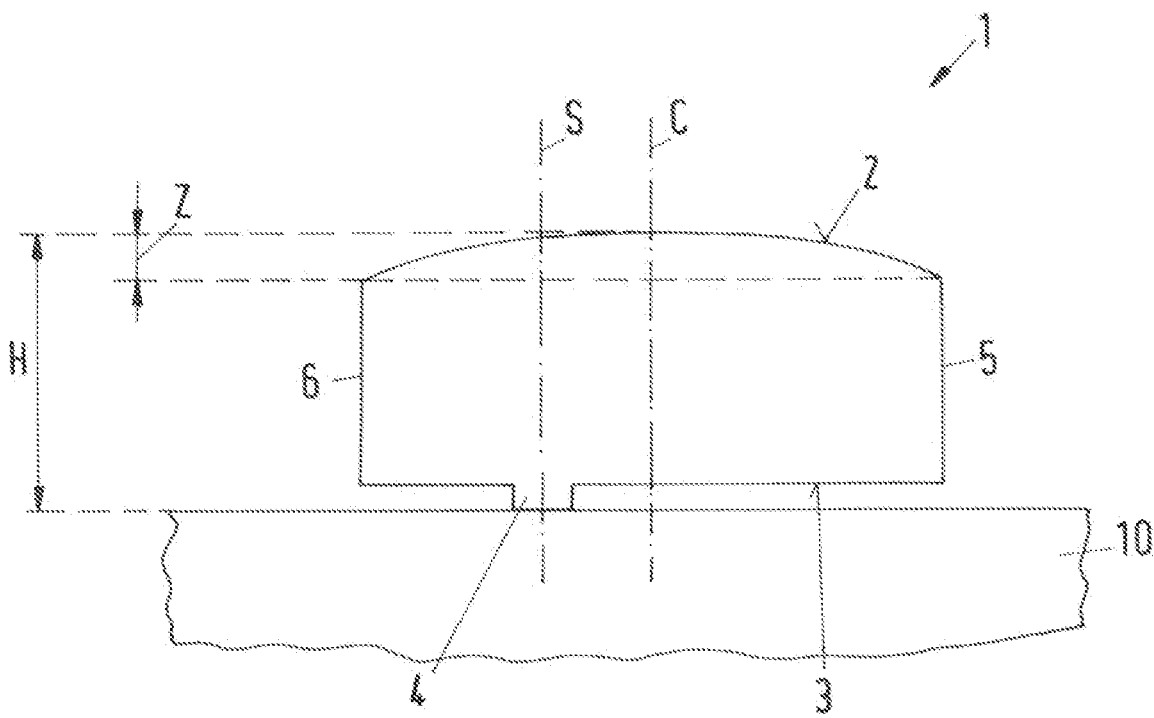
FIG. 6 is a side view of the first embodiment.

FIG. 4 shows a plan view of a first embodiment of a pad for a tilting pad thrust bearing according to the invention. The pad is designated in its entity with reference numeral 1. For a better understanding FIG. 5 shows an enlarged cross-sectional view along cutting line V-V in FIG. 4, and FIG. 6 shows a side view of the first embodiment of the pad 1.

The pad 1 comprises a top surface 2. When the pad 1 is mounted in a tilting pad thrust bearing assembly (FIG. 11) the top surface 2 faces a collar 9, which is fixed to a rotatable shaft 110 of a rotary machine in a torque proof manner as it is known in the art. FIG. 4 shows a plan view on the top surface 2. The top surface 2 is also referred to as active surface, because the top surface 2 interacts with the collar 9 during operation. The pad 1 comprises a leading edge 5, a trailing edge 6, an outer edge 7 and an inner edge 8. The leading edge 5 and the trailing edge 6 are defined by the rotation of the collar 9 indicated by the arrow R in FIG. 4. The collar 9 rotates from the leading edge 5 to the trailing edge 6 of the pad 1.

FIG. 4 refers to a counterclockwise rotation R. Of course, the rotation R could also be in the opposite direction, i.e. clockwise. In this case the pad geometry would be a mirror image of FIG. 4 around a center line C of the top surface 2.

The leading edge 5 extends in a radial direction X. The term "radial direction" refers to the operational state, when the pad 1 is arranged in a tilting pad thrust bearing assembly for supporting a shaft of a rotary machine. The longitudinal axis of the shaft, about which the shaft rotates during operation, defines the axial direction A. A direction perpendicular to the axial direction is referred to as a radial direction. Thus, during operation the leading edge 5 of the pad extends in a radial direction X. A direction perpendicular to the axial direction A and the radial direction X is referred to as a circumferential direction. Thus, a movement from the leading edge 5 to the trailing edge 6 is a movement in circumferential direction.

The leading edge 5 extends from a radially inner end 51 to a radially outer end 52.

The outer edge 7 is the radially outer edge of the pad 1 and the inner edge 8 is the radially inner edge of the pad 1. Thus, the radially inner end 51 of the leading edge 5 connects the leading edge 5 with the inner edge 8 of the pad 1, and the radially outer end 52 of the leading edge 5 connects the leading edge 5 with the outer edge 7 of the pad 1.

The top surface 2 has the center line C extending in the radial direction X. The center line C denotes the middle line of the top surface 2. The pad 1 further comprises a bottom face 3 opposite to the top surface 2. The bottom face 3 is also referred to as the "back" of the pad 1. At the bottom face 3 a pivot element 4 is arranged for example a pivot bar or a pivot point or other arrangements so that the pad can freely tilt around a line or a point and transfer load into a stationary supporting structure. As shown in FIG. 6 (see also FIG. 11) the pad 1 is arranged on a stationary support body 10 such that the pivot element 4 is supported by the support body 10 according to any manner known in the art. The location of the pivot element 4 is indicated by the support line S in FIG.

4, which extends in radial direction. The pivot element 4 is arranged such, that the support line S is closer to the trailing edge 6 than to the leading edge 5. Thus, the support line S does not coincide with the center line C. The distance between the support line S and the center line C is referred to as offset. The offset can be measured by the angle distance between the support line S and the centerline C.

According to other embodiments the offset can also be zero, i.e. the support line S is coincident with the center line C. Such a design is also referred to as center pivoted pad 1. A center pivoted pad is bi-directional in operation, i.e. it can tilt in both directions. Such center pivoted pads can be used in bi-directional bearings.

The pad 1 has a height H, which is the distance between the radially inner end of the pivot element 4 in the bottom face 3 and the top surface 2 of the pad 1. Referring to the mounted state, the height H is the extension of the pad 1 in the axial direction A.

The pad 1 has an circumferential length E in the circumferential direction. The circumferential length E is the chord length at the middle radial position of the pad. This is the distance between the leading edge 5 and the trailing edge 6 measured in the middle between the which is the distance between the inner edge 8 and the outer edge 7.

The top surface 2 of the pad 1 is nominally flat, but can be—as it is shown in FIG. 6—configured with a crowning, i.e. with a slight convex curvature, which is designed to suit the operating parameters of the thrust bearing the pad 1 is designed for. The operating parameters include speed, load, lubricant viscosity, temperature etc. Typically, the crowning Z is at most 30 micrometer, preferably at most 20 micrometer, but the crowning can also be zero, i.e. the top surface 2 is nominally flat.

According to other embodiments the top surface can also be configured as a stepped face, i.e. having a Rayleigh step.

According to this embodiment of the invention, a fluid channel 20 is arranged at the top surface 2, wherein the fluid channel constitutes a fluid communication between the leading edge 5 of the pad 1 and the top surface 2 of the pad 1.

In the first preferred embodiment the fluid channel 20 is designed as a face slot in the top surface of the pad 1, wherein a depth T of the face slot 20 (FIG. 5) is largest at the leading edge 5 and decreases towards the center line C of the top surface 2.

For a better understanding the fluid channel 20, which is designed as a face slot in the top surface 2 of the pad 1, is shown in FIG. 4 with a hatching, although FIG. 4 shows a plan view onto the fluid channel. The hatching is only for the purpose of a better understanding.

Preferably, the fluid channel 20 has a width W measured in the radial direction X at the leading edge 5, which is smaller than the length LL of the leading edge 5 in the radial direction X. The length LL of the leading edge 5 is the distance between the radially inner end 51 and the radially outer end 52 of the leading edge 5.

Preferably, the width W of the fluid channel 20 at the leading edge 5 is at least 50% and at most 90% of the length LL of the leading edge 5. In a particularly preferred configuration the width W of the fluid channel 20 is approximately 80% of the length LL of the leading edge 5.

The remaining part of the leading edge 5, which is not covered by the fluid channel 20, forms at least one land 53 or 54 delimiting the fluid channel 20 at the leading edge 5 with respect to the radial direction. The land 53 or 54 is flush with the top surface 2, so that the land 53, 54 does not project beyond the top surface 2 with respect to the axial direction.

Preferably, and as it can be best seen in FIG. 4 the leading edge 5 comprises a radially inner land 53 and a radially outer land 54 and the fluid channel 20 is arranged between the lands 53 and 54. Thus, the fluid channel is delimited with respect to the radial direction by the radially inner land 53 and be the radially outer land 54. Both lands 53, 54 are flush with the top surface 2.

As it can be best seen in FIG. 4 the radially inner land 53 is arranged at the radially inner edge 51 of the leading edge 5, so that the radially inner land 53 forms the radially inner end 51, and the radially outer land is arranged at the radially outer end 52 of the leading edge 5, so that the radially outer land 54 forms the radially outer end 52 of the leading edge 5.

Preferably, the radially inner land 53 and the radially outer land 54 have the same extension in the radial direction, to provide a symmetrical leading edge 5 with respect to the radial direction. Thus, if the width W of the fluid channel 20 at the leading edge 5 is 80% of the length LL of the leading edge 5 in radial direction, each of the lands 53 and 54 has an extension in the radial direction that equals 10% of the length LL of the leading edge 5.

The extension of the fluid channel 20 in the circumferential direction, i.e. perpendicular to the leading edge 5, is designated as the length L of the fluid channel 20. The length L is the extension of the fluid channel from the leading edge 5 towards the center line C of the pad 1. Preferably the length L of the fluid channel 20 is at most 50% of the circumferential length E of the pad 1. Even more preferred the length L of the fluid channel is at most 25% or even at most about 10% of the circumferential length E of the pad 1.

As an example, the circumferential length E of the pad 1 can be 50 mm, the length L of the fluid channel 20 is 5 mm, i.e. 10% of the circumferential length E. The width W of the fluid channel 20 is 80% of the length LL of the leading edge 5, and each land 53, 54 has an extension in the radial direction, which is in each case 10% of the length LL of the leading edge 5. Typically the depth T of the fluid channel can be 50 micrometer to 100 micrometer.

These dimensions of the pad 1 are of course exemplary. The pad 1 according to the invention can be configured smaller, larger or even much larger as in this example.

As it can be best seen in FIG. 5 the fluid channel 20 has an essentially triangular cross-section when viewed in the radial direction. The fluid channel 20 is arranged in the top surface 2 of the pad 1 and delimited by the radially inner land 53 and the radially outer land 54 forming side walls of the fluid channel 20, as well as by a bottom 21. The depth T of the fluid channel 20 is largest at the leading edge 5 and then decreases linearly towards the center line C until the bottom 21 of the fluid channel 20 merges with the top surface 2.

Figure 7:
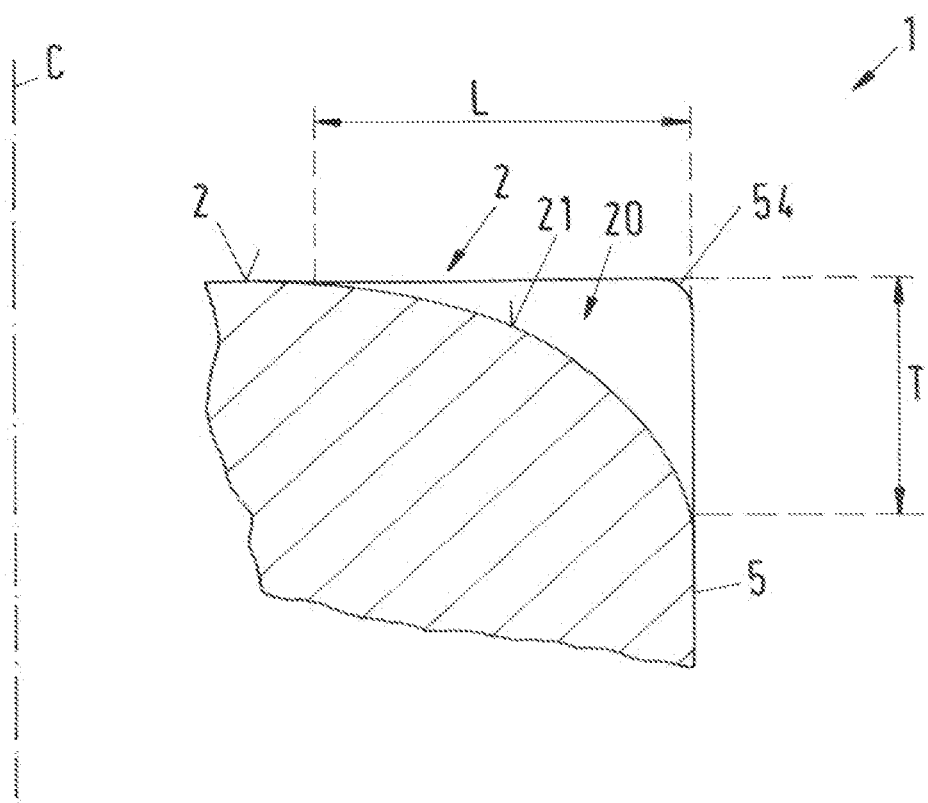
FIG. 7 is a variant for the configuration of the fluid channel in an analogous representation as in FIG. 5, FIGS. 8-10 are as FIG. 4 but for other embodiments of the pad according to the invention.

FIG. 7 shows a variant for the configuration of the fluid channel 20 in an analogues representation as FIG. 5. According to this variant the bottom 21 of the channel 20 is curved.

Figure 8:
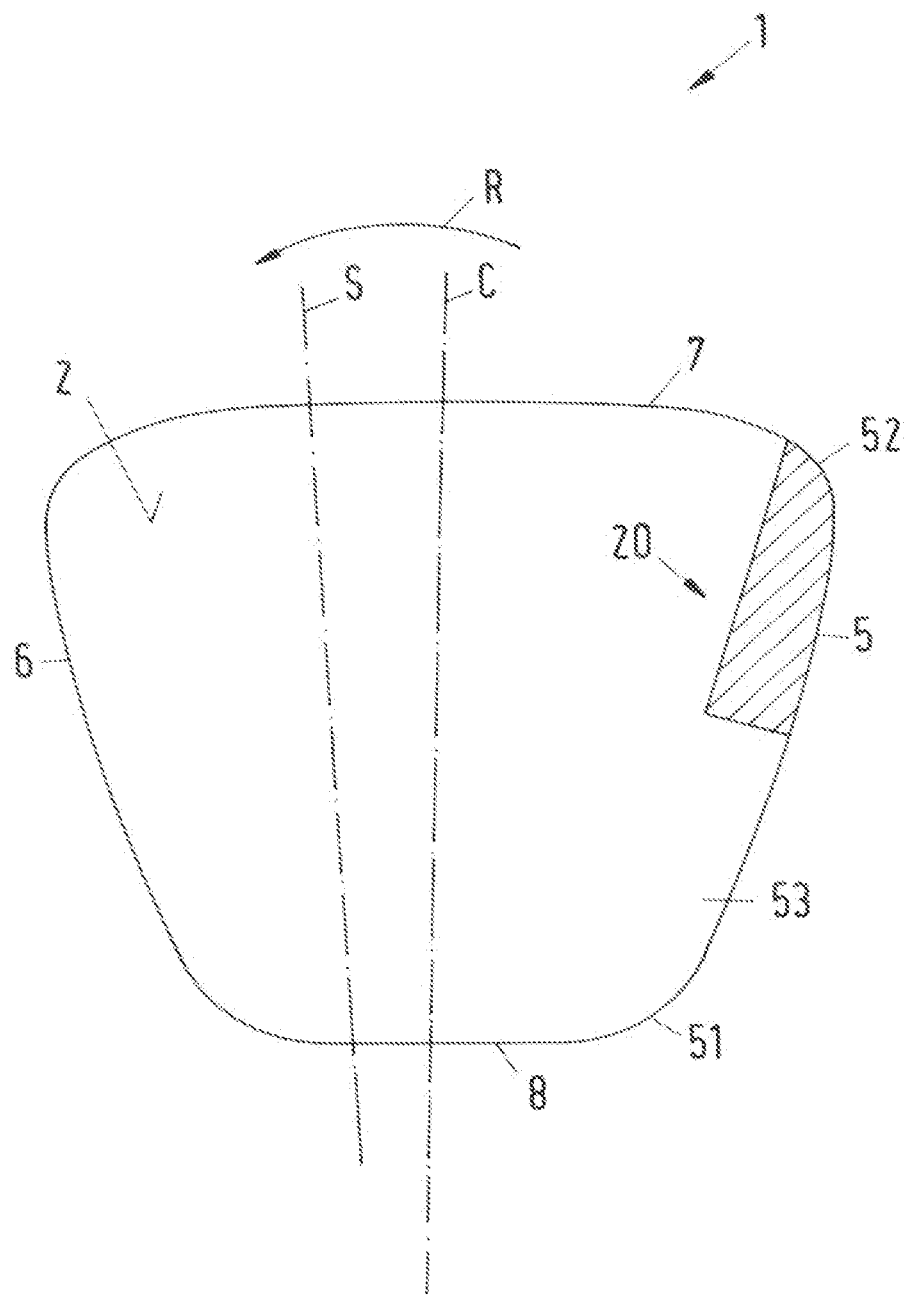
Figure 9:
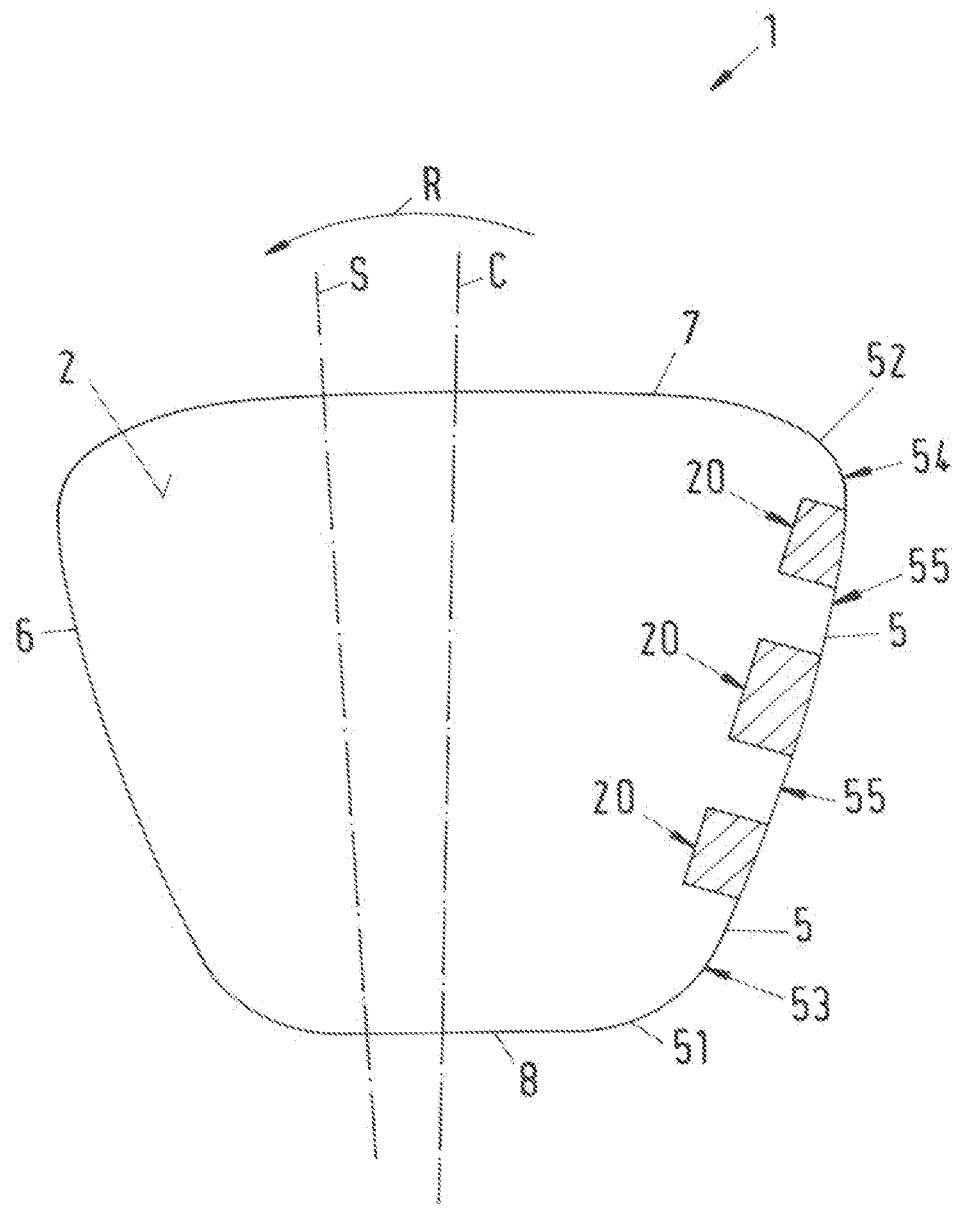
Figure 10:
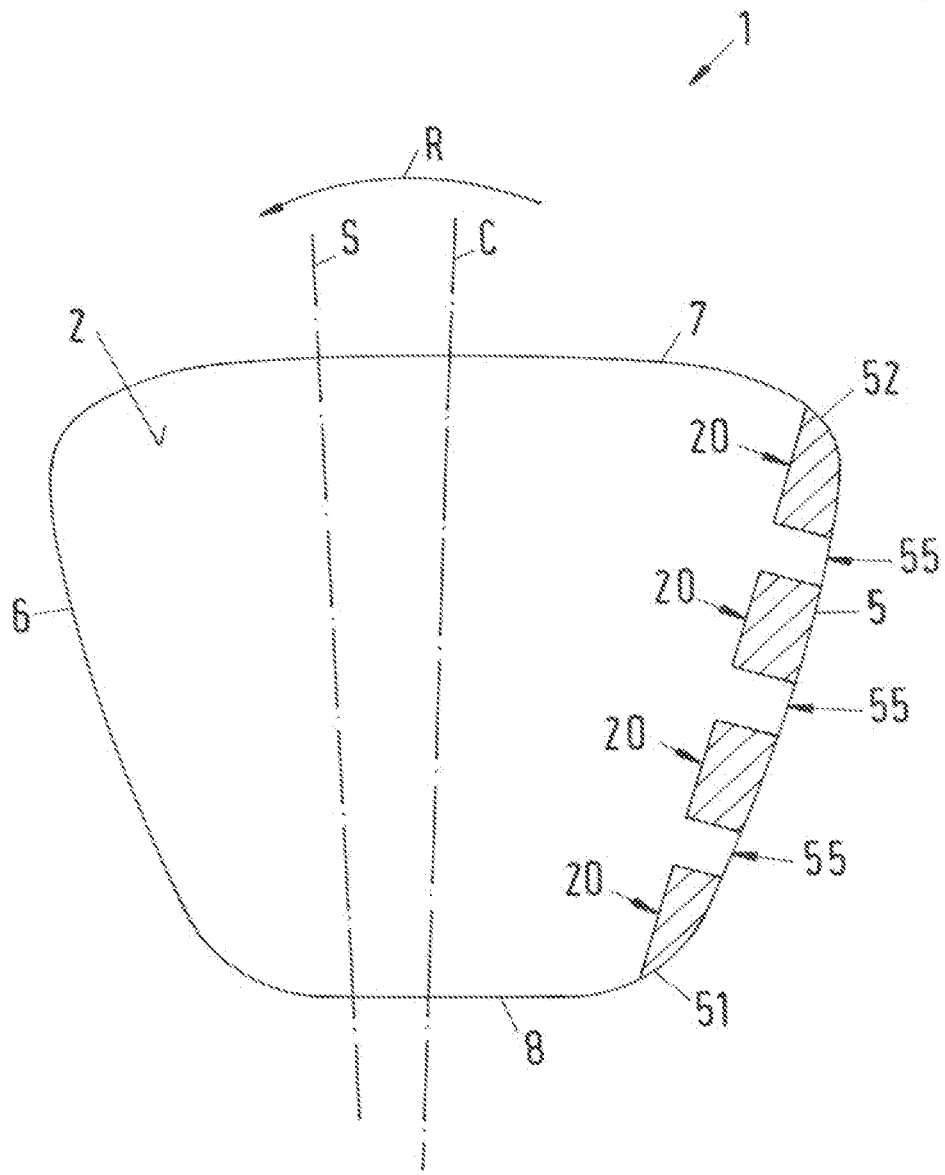

FIG. 8 to FIG. 10 show other embodiments of the pad 1 according to the invention in an analogous representation as FIG. 4.

In the following description of the other embodiment of the pad 1 for a tilting pad thrust bearing only the differences to the first embodiment are explained in more detail. The explanations with respect to the first embodiment and the variant (FIG. 7) are also valid in the same way or in analogously the same way for the other embodiments. Same reference numerals designate the same features that have been explained with reference to the first embodiment or functionally equivalent features.

As in FIG. 4, in each of FIG. 8-10 for a better understanding the fluid channel 20, which is designed as a face slot in the top surface 2 of the pad 1, is shown with a hatching, although each of FIG. 8-10 shows a plan view onto the fluid channel 20, or the top surface 2, respectively. The hatching is only for the purpose of a better understanding.

FIG. 8 shows an embodiment of the pad 1, where the fluid channel 20 is disposed at the radially outer end 52 of the leading edge 5. In this embodiment there is only one land 53, namely the radially inner land 53. The fluid channel 20 forms the radially outer end 52 of the leading edge 5.

FIG. 9 shows an embodiment comprising a plurality of fluid channels 20, wherein each fluid channel 20 forms a fluid communication between the leading edge 5 of the pad 1 and the top surface 2. Each fluid channel 20 is designed as a face slot 20 in the top surface 2 of the pad 1. All fluid channels 20 are arranged between the radially inner land 53 and the radially outer land 54. Additional inner lands 55 are provided, so that adjacent fluid channels 20 are in each case separated by one of the inner lands 55. The radially inner land 53 is arranged at the radially inner edge 51 of the leading edge 5, so that the radially inner land 53 forms the radially inner end 51, and the radially outer land is arranged at the radially outer end 52 of the leading edge 5, so that the radially outer land 54 forms the radially outer end 52 of the leading edge 5. FIG. 9 shows by way of example a design with three individual fluid channels 20. Of course, in other embodiments the pad 1 can comprise more or less than three flow channels 20.

FIG. 10 shows an embodiment, which also comprises a plurality of fluid channels 20, wherein each fluid channel 20 forms a fluid communication between the leading edge 5 of the pad 1 and the top surface 2. Each fluid channel 20 is designed as a face slot 20 in the top surface 2 of the pad 1. Different from the embodiment shown in FIG. 9, the embodiment shown in FIG. 10 does not comprise the radially inner land 53 and the radially outer land 54, but only inner lands 55. At the radially outer end 54 of the leading edge 5 one of the fluid channels 20 is disposed, the fluid channel forming the radially outer end 52 of the leading edge 5. In addition, at the radially inner end 53 of the leading edge 5 one of the fluid channels 20 is disposed, the fluid channel 20 forming the radially inner end 51 of the leading edge 5. Adjacent fluid channels 20 are in each case separated by one of the inner lands 55.

FIG. 10 shows by way of example a design with four individual fluid channels 20 and three inner lands 55. Of course, in other embodiments the pad 1 can comprise more or less than four flow channels 20.

Figure 11:
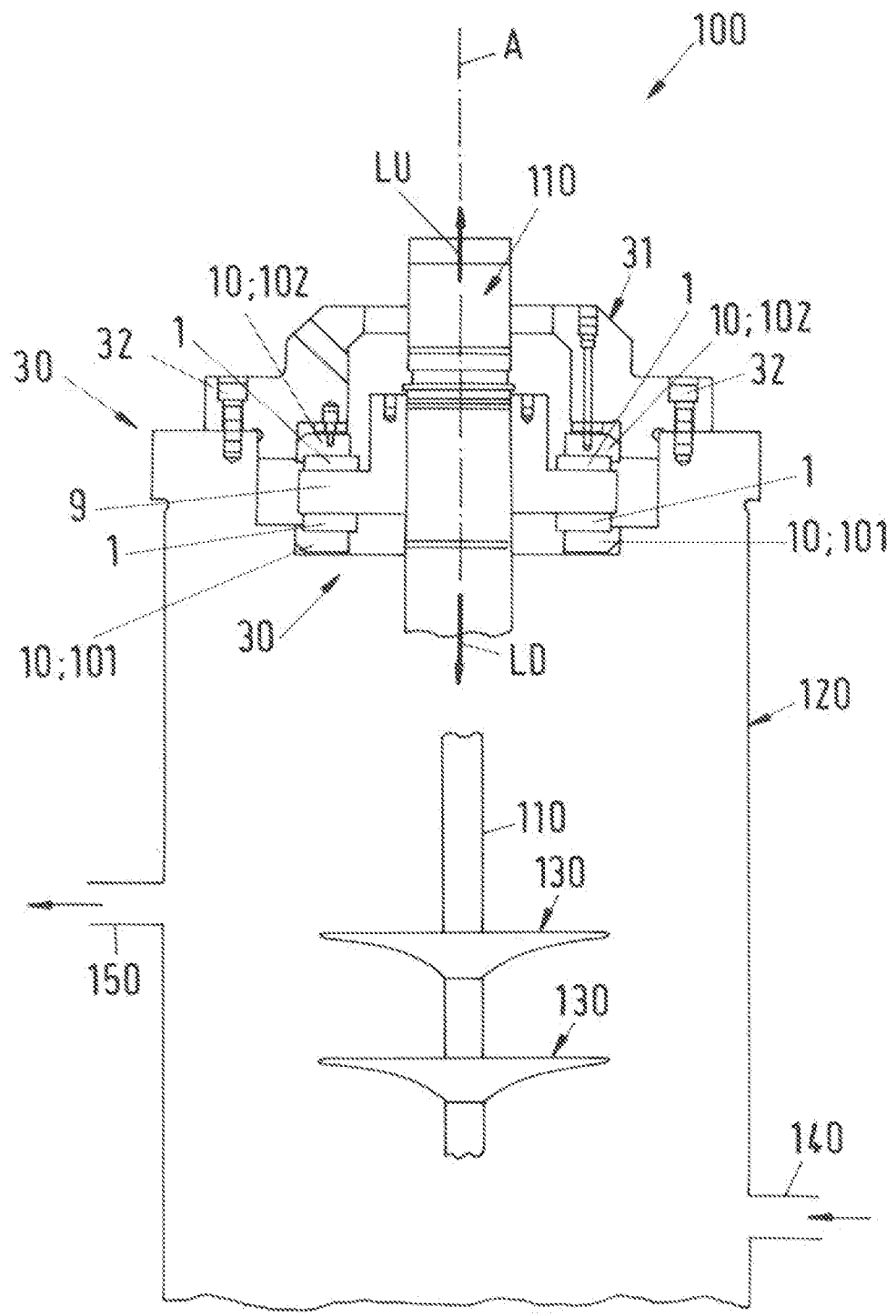
FIG. 11 is a cross-sectional view of an embodiment of a tilting pad thrust bearing assembly according to the invention.

FIG. 11 shows a cross-sectional view of an embodiment of a tilting pad thrust bearing assembly according to the invention and arranged in a rotary machine 100. The tilting pad thrust bearing assembly is designated in its entity with reference numeral 30. The tilting pad thrust bearing assembly 30 supports a shaft 110 of the rotary machine 100 which is indicated in FIG. 11 only schematically.

The rotary machine 100 is for example a pump 100, in particular a centrifugal pump 100. Particularly, the centrifugal pump can be configured as a helico-axial pump. Within this application the term "centrifugal pump" is used for all pumps having at least one rotating impeller. Thus, within the meaning of this application the term centrifugal pump comprises in particular pumps configured with radial or axial or helico-axial impeller(s).

The pump 100 comprises a pump housing 120 with an inlet 140 for receiving a process fluid and an outlet 150 for discharging the process fluid. Within the pump housing 120 at least one impeller 130 acts on the process fluid and for conveying the process fluid from the inlet 140 to the outlet 150. The pump 100 can be designed as a multistage pump with a plurality of impellers 130. Each impeller 130 is fixed to the shaft 110 in a torque proof manner. The shaft 110 is rotatable about an axial direction A for driving the rotation of each impeller 130. The longitudinal axis of the shaft 110, about which the shaft 110 rotates during operation, defines the axial direction A. A direction perpendicular to the axial direction A is referred to as a radial direction.

The pump 100 further has an axial bearing which comprises the tilting pad thrust bearing assembly 30 for supporting the shaft 110 with respect to the axial direction A. The bearing assembly 30 is configured to take an axial load which is directed upwardly according to the representation in FIG. 11 an to take an axial load which is directed downwardly according to the representation in FIG. 11. The axial loads are represented by the arrows LU and LD in FIG. 11.

The tilting pad thrust bearing assembly comprises a bearing housing 31 for receiving a lubricant, a support body 10 and a plurality of pads 1 arranged at the support body 10 for being supported by the support body 10. Each pad 1 is designed in accordance with the embodiments of the invention.

The shaft 110 includes a collar 9 which is fixedly connected to the shaft 110 in a torque proof manner. The support body 10 comprises a inboard support ring 101 and an outboard support ring 102 which are both mounted such that they are stationary with respect to the bearing housing 31 and that each support ring 101, 102 coaxially surround the shaft 110. The inboard support ring 101 is spaced apart from the outboard support ring 102 with respect to the axial direction A. The collar 9 is arranged between the support rings 101, 102.

On each of the support rings 101, 102 a respective plurality of pads 1 is arranged in a ring-like pattern, such that the respective plurality of pads 1 in each case surrounds the shaft 110. As an example, on each support ring 101 and 102 can be arranged eight pads 1 in an annular arrangement around the shaft 110.

Each pad 1 is arranged such, that the top surface 2 of the respective pad 1 faces the collar 9 and the pivot element 4 of the respective pad 1 is supported by the respective support ring 101 or 102.

The bearing housing 31 is fixedly connected to the pump housing 120 by means of screws 32 or any other suited fixing means or device.

During operation the lubricant is circulated through the bearing housing 31 for lubricating between the pads 1 and the collar 9, as well as for cooing the assembly 30.

In particular, the pump 100 can be configured for subsea applications, for example for deployment on a sea ground. The pump 100 can be configured as a helico-axial pump, as a multiphase pump, as a multistage pump, as a multistage multiphase pump or as any other pump having at least one rotating impeller.

The subsea pump 100 has to be configured to withstand the ambient hydrostatic pressure of the seawater. For example in 500 m below the water surface the hydrostatic pressure of the seawater is already about 50 bar, meaning that the minimum pressure inside the pump housing 120 has to be at least somewhat greater than 50 bar. Therefore, also the tilting pad thrust bearing assembly 30 is configured for an internal pressure of the lubricant in the bearing housing of at least 50 bar. Of course the assembly can also be designed for a pressure considerably above 50° bar.

The lubricant, which is circulated through the bearing housing 31 can be for example the barrier fluid that is used to prevent the process fluid from entering the bearing unit or the drive unit which drives the rotation of the shaft 110. The barrier fluid is for example a mixture of water and glycol.

The invention claimed is:

1. A pad for a tilting pad thrust bearing for supporting a shaft of a rotary machine, the pad comprising:
   a top surface;
   a leading edge extending in a radial direction;
   a trailing edge; and
   a fluid channel arranged at the top surface, the fluid channel ending in the top surface, and the fluid channel forming a fluid communication between the leading edge of the pad and the top surface of the pad, the fluid channel being a face slot in the top surface of the pad, a depth of the face slot being largest at the leading edge and decreasing towards a centerline of the top surface, a width of the fluid channel measured in a radial direction at the leading edge of the pad being smaller than a length of the leading edge in the radial direction, and the fluid channel having a length measured in the top surface and perpendicular to the leading edge, which is at most 25% of a circumferential length of the pad.

2. The pad in accordance with claim 1, wherein the width of the fluid channel measured in the radial direction at the leading edge is at least 50% and at most 90% of the length of the leading edge in the radial direction.

3. The pad in accordance with claim 1, wherein the leading edge comprises at least one land delimiting the fluid channel at the leading edge with respect to a radial direction, and the land is flush with the top surface.

4. The pad in accordance with claim 1, wherein the leading edge comprises a radially inner land and a radially outer land, the fluid channel is arranged between and delimited by the radially inner land and the radially outer land, and each of the radially inner land and the radially outer land is flush with the top surface.

5. The pad in accordance with claim 4, wherein the radially inner land is arranged at a radially inner end of the leading edge and the radially outer land is arranged at a radially outer end of the leading edge.

6. The pad in accordance with claim 1, wherein the leading edge comprises a plurality of face slots forming the fluid communication, each adjacent face slot being separated by a land at the leading edge.

7. The pad in accordance with claim 1, wherein the width of the fluid channel measured in the radial direction at the leading edge is at least 50% and at most 80% of the length of the leading edge in the radial direction.

8. The pad in accordance with claim 1, wherein the length of the fluid channel measured in the top surface and perpendicular to the leading edge is at most 10% of a circumferential length of the pad.

9. A tilting pad thrust bearing assembly for supporting a shaft of a rotary machine, comprising:
   a bearing housing;
   a support body; and
   a plurality of pads arranged at the support body, each pad of the plurality of pads configured in accordance with claim 1.

10. A centrifugal pump comprising:
    a pump housing;
    at least one impeller configured to act on a process fluid;
    a shaft fixedly connected to the impeller and configured to rotate the impeller; and
    an axial bearing configured to support the shaft with respect to an axial direction, the axial bearing comprising the tilting pad thrust bearing assembly in accordance with claim 9.

11. The centrifugal pump in accordance with claim 10, wherein the pump is a multistage pump and the at least one impeller is one of a plurality of impellers.

12. The centrifugal pump in accordance with claim 10 configured to be installed on a sea ground.

\* \* \* \* \*